United States Patent Office 3,144,272
Patented Aug. 11, 1964

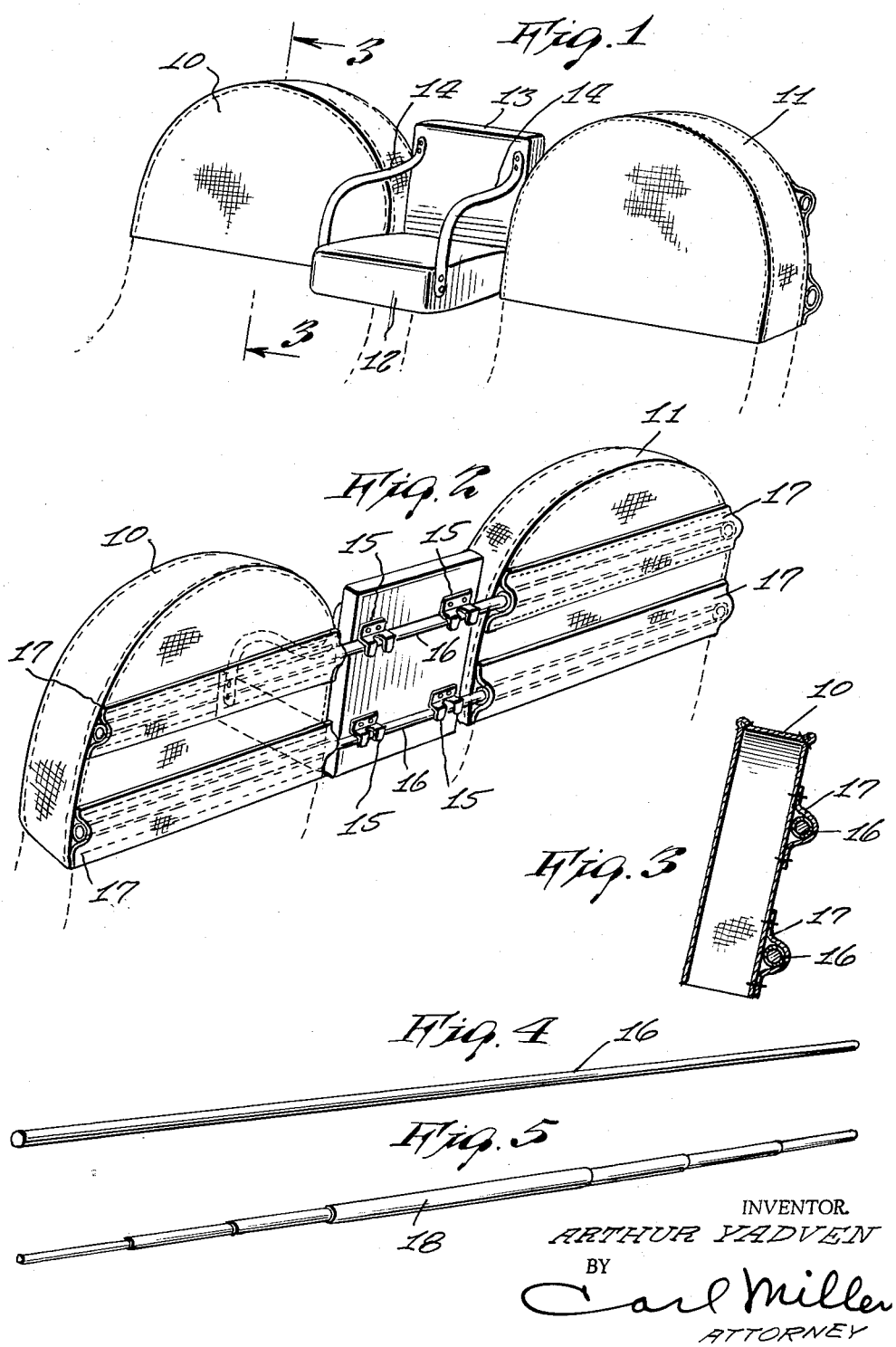

3,144,272
BABY SEAT BETWEEN SEPARATE SEATS
Arthur Yadven, Bronx, N.Y. (% Kamlet Laboratories, 300 Park Ave. S., New York 10, N.Y.)
Filed Dec. 4, 1961, Ser. No. 156,639
4 Claims. (Cl. 297—248)

My invention is directed toward car seats adapted for use by infants and young children while riding in an automobile.

It is an object of my invention to provide a new and improved car seat of the character indicated.

Another object is to provide a new and improved car seat which can be held in place between two separate front seats in an automobile.

Still another object is to provide a new and improved car seat adapted to be supported within the space between two separate bucket seats with the aid of specially designed seat covers which cover these seats.

These and other objects of my invention will either be explained or will become apparent hereinafter.

In accordance with my invention, a car seat is positioned between first and second adjacent seats in an automobile as for example two bucket seats in the front of the automobile. First and second vertically displaced horizontal members are secured to the back of the car seat and extend within first and second horizontal supporting channels attached to the rear of first and second seat covers applied over the first and second seats respectively. These members hold the car seat in place.

Illustrative embodiments of my invention will now be described with reference to the accompanying drawings wherein:

FIGURE 1 is a front perspective view of my invention in assembled position.

FIGURE 2 is a rear perspective view of my invention in assembled position.

FIGURE 3 is a cross-sectional view taken along the line 3—3 in FIGURE 1.

FIGURE 4 is a perspective view of one of the rods shown in FIGURE 2.

FIGURE 5 is a perspective view of a modified form of the bar of FIGURE 4 which is telescopic.

Referring now to the drawings, positioned between adjacent bucket seats of an automobile is a car seat having a horizontal base 12, a vertical back 13, and first and second supporting arms 14 extending between back 13 and base 12. The bucket seats are covered by seat covers 10 and 11 respectively.

Clamps 15 secured to the rear surface of back 13 support first and second vertically displaced horizontal rods 16. These rods 16 fit in to first and second horizontal supporting channels 17 attached to the rear of each of seat covers 10 and 11.

These rods can be of fixed length as shown in FIGURE 4 or can be telescopic as shown at 18 in FIGURE 5.

While I have shown and pointed out and described my invention in the manner disclosed above, many modifications falling within the scope and sphere of my invention will be apparent to those skilled in the art. I desire to be limited, therefore, only by the terms of the claims which follow.

Having thus described my invention, I claim as new and desire to secure by Letters Patent:

1. In combination with an automobile having first and second bucket seats, first and second seat covers covering said first and second seats respectively, a car seat having a back disposed between said seats, said car seat having at least one horizontally extending straight member centrally secured to the back of said car seat with the end portions of said straight member extending laterally beyond each side of said back, and elongated horizontal pocket means carried by the rear of each said seat covers to receive a lateral extension of said straight member to horizontally support the same and hold said car seat in position.

2. In combination with an automobile having first and second bucket seats, first and second seat covers covering said first and second seats respectively, the rear of each of said first and second covers having first and second vertically separated horizontally extending channels, the first and second seat channels being aligned, and a car seat disposed between said first and second seats, said car seat having a horizontal base, a vertical back attached to said base, first and second supporting arms respectively extending between opposite top front corners of said back and the opposite corners of said base which are remote from said back and first and second horizontally extending straight members secured to the rear of said back, the first member being supported by and extending within the first channels of both first and second seats, the second member being supported by and extending within the second channels of both said first and second seats.

3. A car seat as set forth in claim 2, wherein both said straight members are rods of fixed length.

4. A car seat as set forth in claim 2, wherein both said straight members are telescopic members.

References Cited in the file of this patent
UNITED STATES PATENTS

| | | |
|---|---|---|
| 277,272 | Hale | May 8, 1883 |
| 724,583 | Jones | Apr. 7, 1903 |
| 724,799 | Buckel | Apr. 7, 1903 |
| 1,089,871 | Scholey | Mar. 10, 1914 |
| 1,387,049 | Gunderson | Aug. 9, 1921 |
| 1,657,285 | Siskin | Jan. 24, 1928 |
| 1,853,848 | Cross | Apr. 12, 1932 |
| 1,855,489 | Rich | Apr. 26, 1932 |
| 2,291,247 | McArthur | July 28, 1942 |
| 2,454,912 | Cunningham | Nov. 30, 1948 |
| 2,493,806 | Dumas | Jan. 10, 1950 |
| 2,725,925 | Sanderson | Dec. 6, 1955 |
| 2,941,578 | Mann | June 21, 1960 |
| 3,022,110 | Brown | Feb. 20, 1962 |
| 3,024,066 | Anderson | Mar. 6, 1962 |
| 3,050,333 | Smith et al. | Aug. 21, 1962 |